April 20, 1926.
N. T. E. SKINNER ET AL
MACHINE FOR FINISHING GLASSWARE
Filed May 6, 1922      7 Sheets-Sheet 7
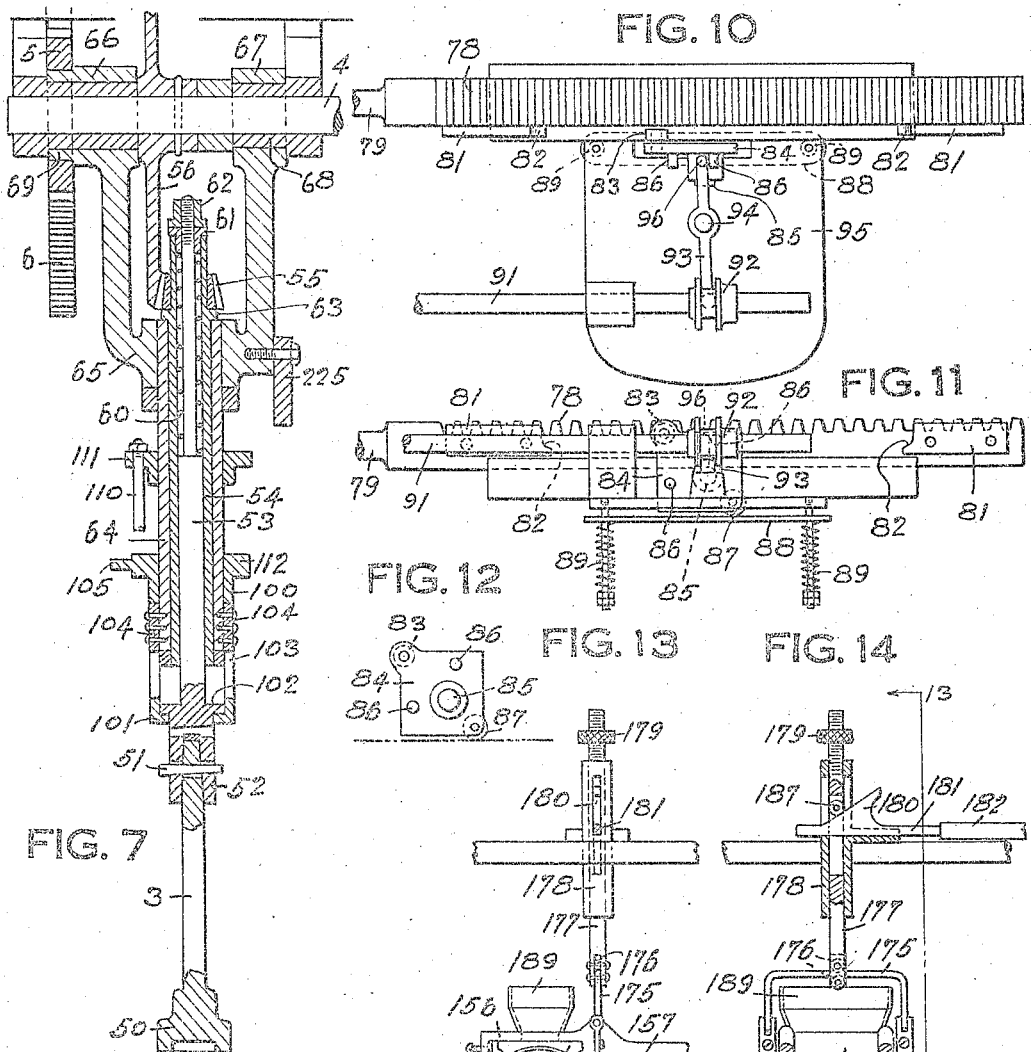
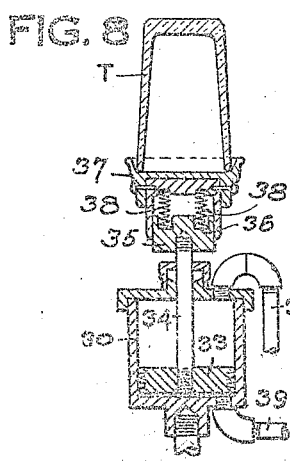
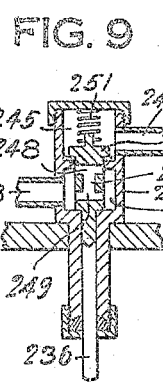
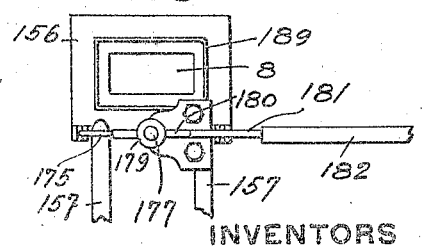
INVENTORS Patented Apr. 20, 1926.

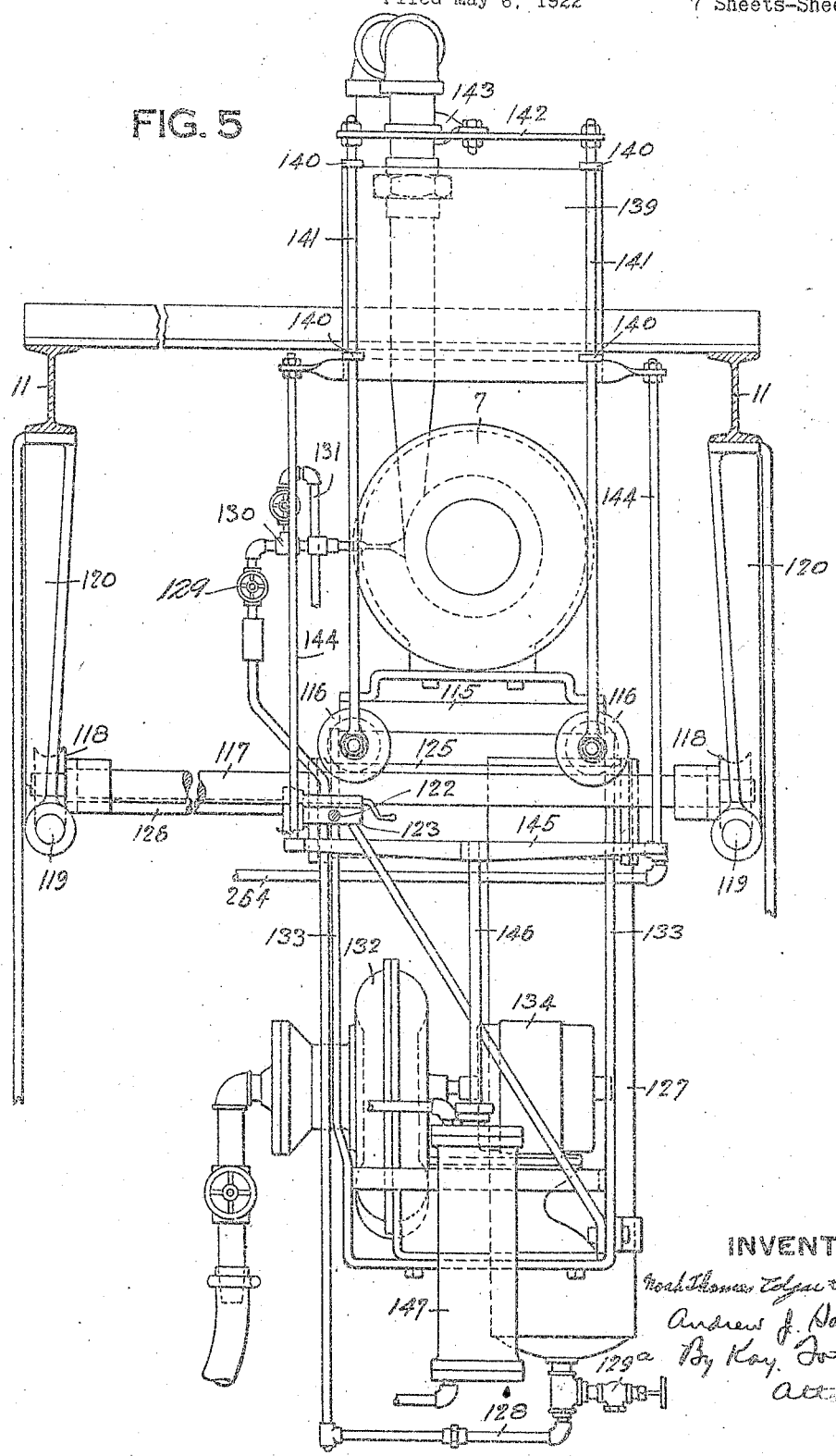

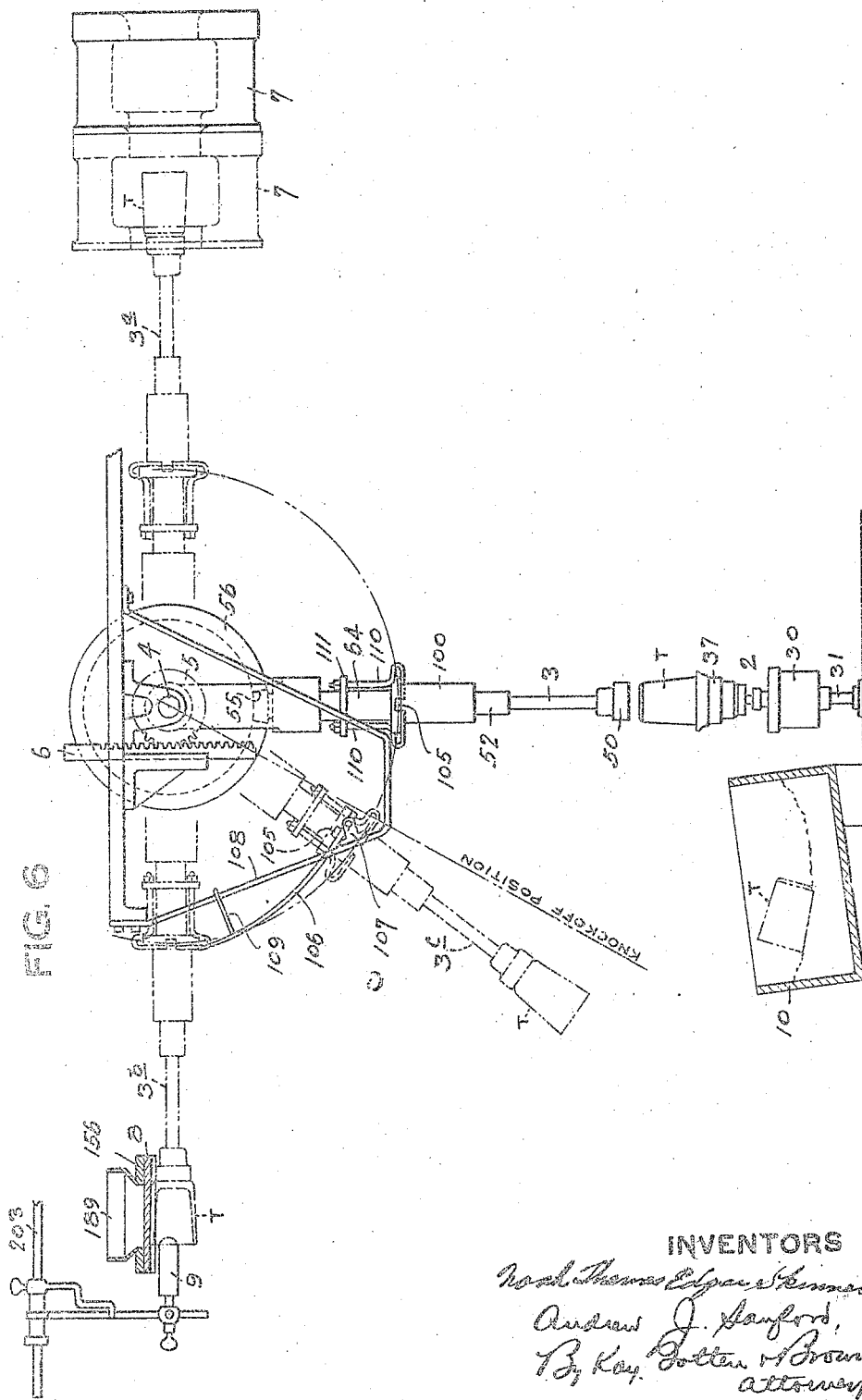

1,581,552

UNITED STATES PATENT OFFICE.

NOAH THOMAS EDGAR SKINNER AND ANDREW J. SANFORD, OF NEWARK, OHIO, ASSIGNORS TO A. H. HEISEY & CO., OF NEWARK, OHIO, A COPARTNERSHIP.

MACHINE FOR FINISHING GLASSWARE.

Application filed May 6, 1922. Serial No. 559,024.

*To all whom it may concern:*

Be it known that we, NOAH THOMAS EDGAR SKINNER and ANDREW J. SANFORD, citizens of the United States, and residents of Newark, in the county of Licking and State of Ohio, have invented a new and useful Improvement in Machines for Finishing Glassware; and we do hereby declare the following to be a full, clear, and exact description thereof.

Our invention relates to machines for fire-polishing and finishing tumblers and other hollow glassware.

The object of our invention is to provide a machine which shall perform the various operations of finishing glassware accurately and more speedily than the same work can be done by hand. To this end we provide a machine which operates to "stick-up" the tumblers or other articles upon a vertical punty, which, after it receives the ware, rocks from the vertical to a horizontal position, where the ware is enclosed in a movable glory hole to fire-polish the ware, after which the punty rocks again through 180° to bring the ware into contact with buffing devices which polish the ware and restore its shape, after which the punty again descends and the ware is "knocked off" automatically.

For the purpose of performing automatically all of the above operations we provide a series of cam-operated compressed air cylinders which impart the necessary movements to the punty and to the glory hole furnace in which the ware is fire-polished, together with additional cams for operating the buffers which finish the ware.

Figure 1:
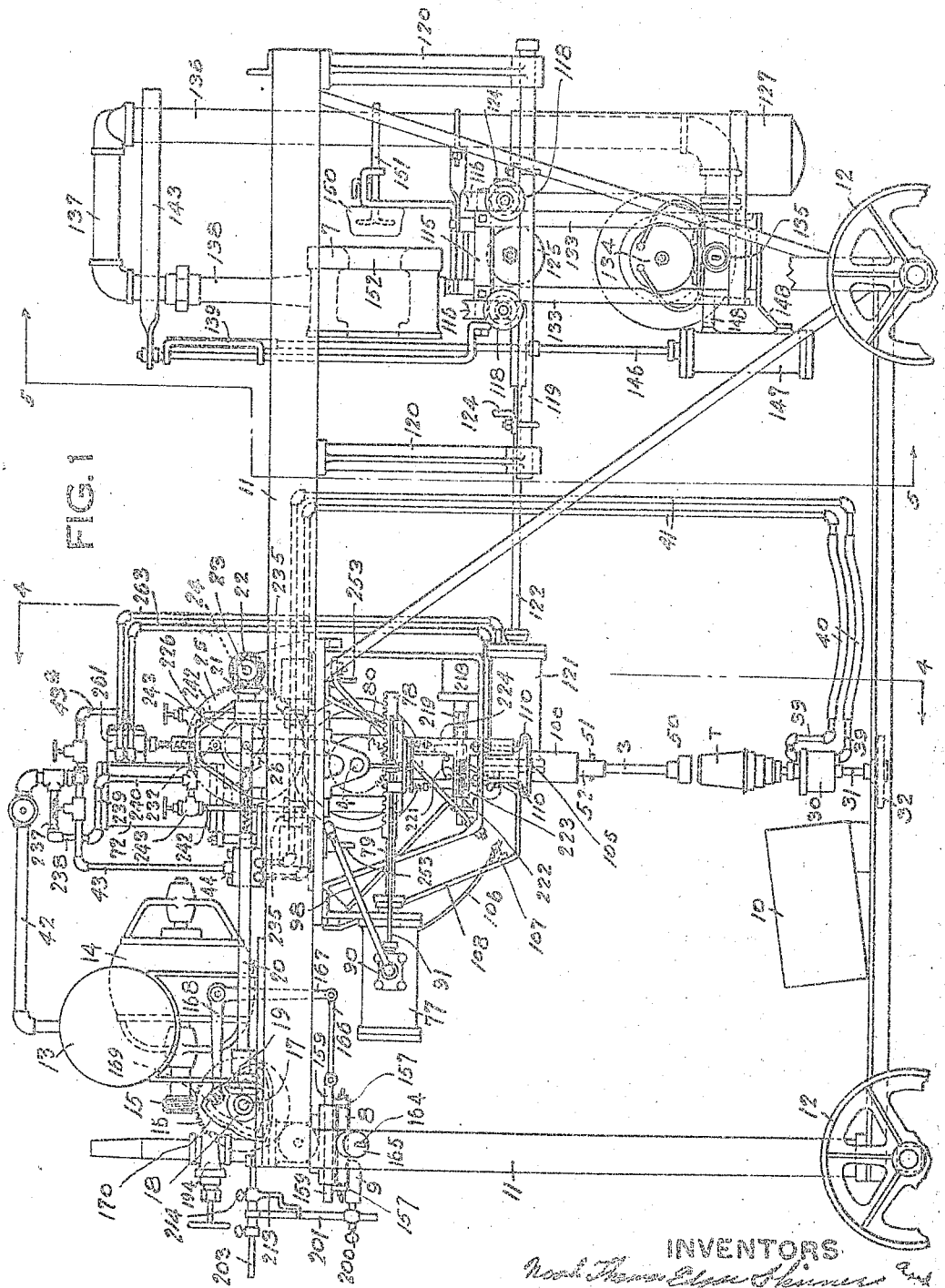
Figure 2:
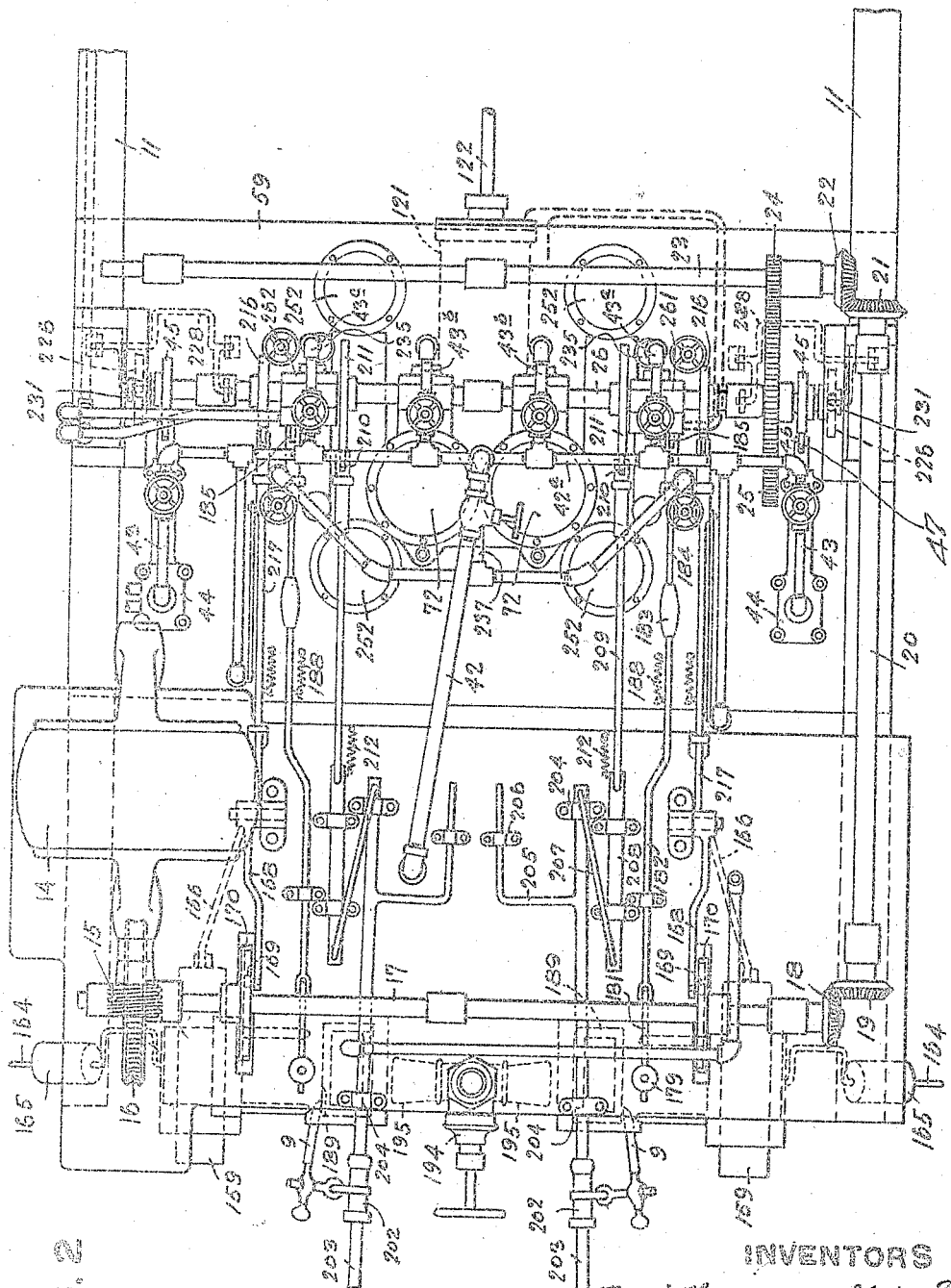
Figure 3:
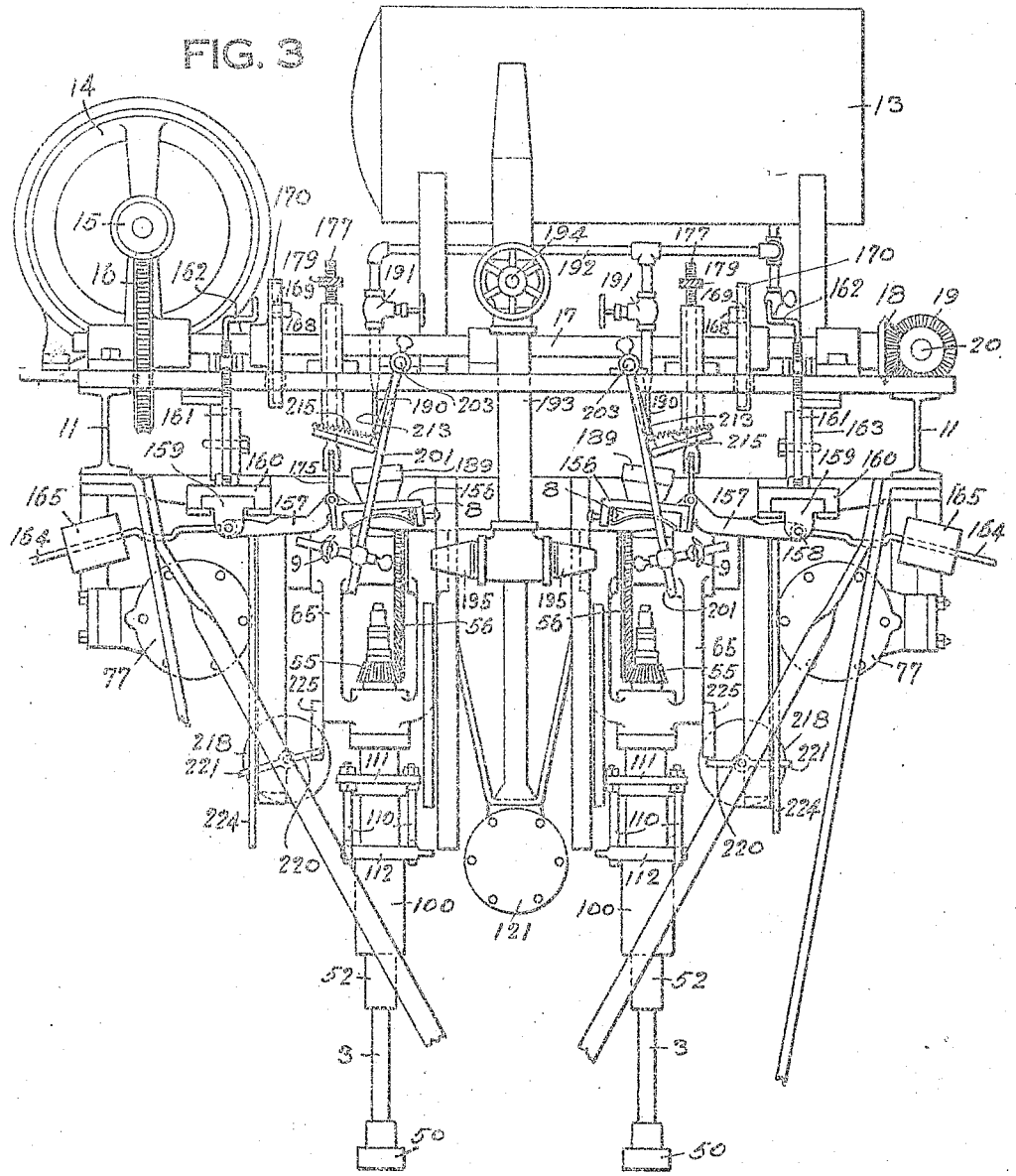
Figure 4:
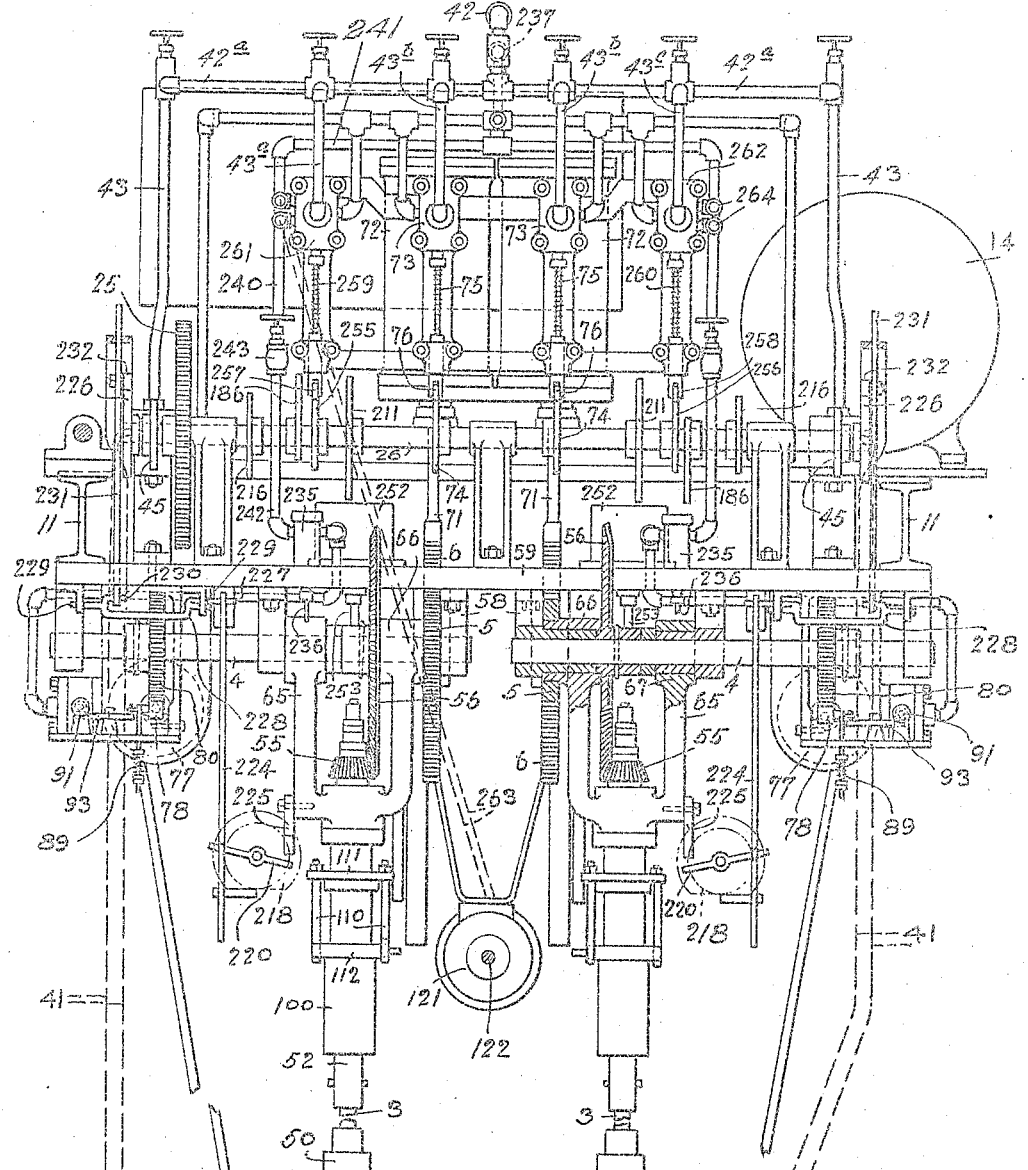

The accompanying drawing shows a machine constructed in accordance with our invention and including two punties and two sets of punty-operating mechanisms. In the drawing, Fig. 1 is a side elevational view of the entire machine; Fig. 2 is a plan view of the left half of Fig. 1; Fig. 3 is an end elevational view taken from the left of Fig. 1; Fig. 4 is a vertical sectional view with parts in elevation, the section being taken substantially on the line 4—4, Fig. 1; Fig. 5 is a vertical section on the line 5—5, Fig. 1, with the glory hole mechanism in elevation; Fig. 6 is a diagrammatic view showing the operation of the punty with relation to the "stick-up" the glory hole, the finishing devices, and the knocking off device; Fig. 7 is a sectional view taken lengthwise through one of the punty arms; Fig. 8 is a vertical sectional view taken centrally through one of the "stick-up" devices; Fig. 9 is a vertical sectional view of one of the poppet valves which control the rotation of the punties; Fig. 10 is a plan view of the reversing mechanism which rotates the punties; Fig. 11 is a side elevational view of the reversing mechanism shown in Fig. 10; Fig. 12 is a side elevational view of the trip which forms a part of the reversing mechanism of Figs. 10 and 11; Fig. 13 is an end elevational view of one of the buffing devices; Fig. 14 is a vertical sectional view taken centrally through the buffing device of Fig. 13; and Fig. 15 is a plan view of the buffing device of Figs. 13 and 14.

For a general understanding of this machine reference may first be had to Fig. 6, which illustrates the several successive operations which are performed upon a tumbler T. The tumbler is first placed upon a "stick-up" device indicated generally by the numeral 2 which rises to attach the tumbler T to the underside of a punty 3 which is loosely suspended from a shaft 4 and is rocked by means of a gear 5 and a vertical rack 6 through an arc of 180°, or from a horizontal position to the right of the shaft 4 to a horizontal position to the left of this shaft. After receiving the tumbler T at the vertical "stick-up" position the punty 3 is rocked to the right, bringing it to the horizontal position 3ª, whereupon the glory hole furnace 7 advances and encloses the tumbler to impart to it a fire polish, the punty 3 being rotated while the tumbler is in the glory hole furnace. The furnace may be withdrawn and again advanced to enclose the tumbler in order to cool the edges of the tumbler and prevent the thickening of its edge. After the fire polishing operation is completed the rack 6 is again operated to swing the punty from the horizontal position 3ª to the horizontal position 3ᵇ at the left of Fig. 6, in which position the tumbler T is engaged by an outside buffer 8, and by an inside buffer 9 which are reciprocated in contact with the tumbler, which at the same time is rotated. When the buffing operation is completed the rack 6 causes the punty to descend from the position 3ᵇ to the vertical starting position B. While the punty is thus descending, the tumbler is automatically knocked off from the punty at the position 3ᶜ and falls into a sand box 10.

The machine is supported upon a structural steel frame 11 which is mounted on wheels 12 to enable the machine to be drawn about the factory to the most convenient location. Compressed air is supplied from a tank 13 to the various cylinders which perform the actual operations upon the glassware and which are controlled by cams driven by an electric motor 14, the armature shaft of which carries a worm 15 meshing with a worm wheel 16 on one end of a counter-shaft 17, the other end of which carries a miter gear 18 meshing with another miter gear 19 on one end of a shaft 20, the other end of which carries a miter gear 21 meshing with a miter gear 22 on a shaft 23. The shaft 23 carries a pinion 24 which meshes with a spur gear 25 secured to a cam shaft 26 which carries a series of operating cams which will be described below.

The detailed description which follows is given with reference to one of the punties, and it will be understood that all of the parts described are duplicated for the other punty, with the exception of the glory hole furnace which operates alternately with both of the punties.

The stick-up device.

The stick-up device by which the glassware is attached to the punty is shown in Figs. 1, 4, 6, and 8, and consists of a compressed air cylinder 30 supported on a standard 31 carried by a transverse member 32 of the frame 11. The cylinder 30 contains a piston 33, the piston rod 34 of which carries at its upper end a block 35 which is loosely surrounded by a sleeve 36 to which is removably attached a cap or die 37 which corresponds in size to the tumbler T, and may be changed to fit different sizes and shapes of glassware. Springs 38 are interposed between the block 35 and the head of the sleeve 36, and provide a resilient support for the tumbler and permit the cap 37 to yield when the piston is raised to bring the tumbler into contact with the underside of the punty 3. Suitable air pipes 39 supply air to the stick-up cylinder 30 and are attached by means of flexible hose connections 40 to pipes 41, to which compressed air from the tank 13 is supplied through pipes 42 and 43 and a valve 44. The valve 44 is automatically controlled by a cam 45 carried by the cam shaft 26, and for this purpose is provided with a spring-pressed valve rod 46 carrying a roller 47 which runs on the cam 45. The cam 45 is so shaped as to cause the valve 44 to admit air to the lower end of the stick-up cylinder 30 at the proper time to raise the tumbler T which has been placed upon the cap 37 by a workman, and press the bottom of the tumbler against the punty 3. The valve 44 is then operated by the cam 45 to operate the stick-up cylinder 30 in the opposite direction, thereby lowering the stick-up and leaving the tumbler suspended from the punty.

The punty arm.

As best shown in Figs. 4 and 7, the punty 3 has an enlarged head 50 to receive the glassware and is attached by means of a pin 51 to a chuck 52 carried at the lower end of a sliding rod 53 which is slidably feathered in a sleeve 54, to the upper end of which is attached a bevel pinion 55 meshing with a bevel gear 56 that is keyed to the shaft 4 which is mounted in bearings 58 secured to the underside of a transverse plate 59 carried by the frame 11. A spring 60 surrounds the reduced upper end portion of the rod 53 and is confined by a nut 61 which is screwed into the upper end of the sleeve 54. A nut 62 is screwed upon the upper end of the rod 53 and limits the downward sliding movement of the rod 53 in the sleeve 54. The sleeve 54 has a flange 63 below the bevel gear 55 which supports the sleeve 54 in a tube 64 which is screwed into a forked yoke 65, the two arms of which are provided with bearings 66 and 67 which loosely surround the shaft 4 and have suitable bearing brasses 68. The bearing 66 of the yoke 65 carries a pinion 69 which is engaged by the vertical punty-operating rack 6. The rack 6 is secured to the piston rod 71 of a vertical compressed air-cylinder 72 which is operated by means of a valve 73 controlled by a cam 74 on the cam shaft 26 through a spring-pressed valve rod 75 having a roller 76 running on the cam 74. The cylinder 72 is so operated by the cam 74 as to swing the punty arm to the several operating positions described above.

The rotation of the punty rod 3 which is required at the fire polishing and finishing positions is produced by a horizontal compressed air cylinder 77 which oscillates the shaft 4, thereby oscillating the punty rod 3 through the bevel gear 56, the bevel pinion 55 and the sleeve 54 which, as stated above, is feathered to the rod 53 which carries the punty 3. A horizontal rack 78 is carried by the piston rod 79 of the cylinder 77 and meshes with a gear 80 which is keyed directly to the shaft 4.

When the punty is rotated back and forth it is necessary that the direction of rotation of the punty be changed instantly, because any pause between rotations would give the plastic tumbler time to lose its shape. In order to produce this instantaneous change in direction we employ a reversing gear which is best shown in Figs. 1, 10 and 11. The rack 78 carries two plates 81 which have curved tripping surfaces 82 in the path of movement of which is a roller 83 carried by a square trip plate 84 which is mounted on a pivot stud 85 and carries two lugs 86 and a roller 87 which rides upon a horizontal plate 88 that is spring pressed upwardly by means of springs 89. The valve 90 which operates the cylinder 77 and which is located adjacent to this cylinder, as shown in Fig. 1, is provided with a valve rod 91 that extends parallel to the rack 78, as shown in Figs. 4 and 10, and is provided with a grooved collar 92 in the groove of which is received one end of a shifting lever 93 pivoted at 94 to a stationary plate 95 and having its other end 96 in the path of movement of the lugs 86.

The operation of this reversing mechanism will best be understood by referring to Figs. 10 and 11 which show the position of the parts when the rack 78 is moving to the right and is therefore rotating the shaft 4 in a counter-clockwise direction, as seen in Fig. 1. The curved surface 82 of the left-hand plate 81 engages the roller 83 of the trip plate 84 and the continued movement of the rack 78 gives a quick quarter-turn to the trip plate 84, the springs 89 yielding to permit the plate to turn and then causing the plate 88 to stop the trip plate 84 in its new position. During this quarter turn the trip plate 84 carries the left-hand lug 86 into engagement with the end 96 of the shifting lever 93, which rocks the shifting lever and, through the collar 92, moves the valve rod 91 quickly to the left. This movement of the valve rod 91 reverses the valve 90 and causes the cylinder 77 to immediately draw in its piston rod 79 carrying with it the rack 78, and rotating the shaft 4 in the opposite direction.

Compressed air is supplied to the cylinder 77 through air pipes, one of which is shown at 98. A safety valve, not shown, may be inserted in the pipe line 98 and may be set to pop off at a pressure slightly less than the pressure of the air in the tank 13. The purpose of this safety valve is to eliminate the danger of breaking some part of the machine in case the punty should happen to stick, and should then suddenly come loose.

In addition to its swinging and rotating movements, the punty 3 is given a lengthwise movement in order to jar the glassware loose from the punty at the knocking-off position. For this purpose the rod 53 is caused to slide lengthwise by means of a sleeve 100 having a flange 101 which engages beneath a flange 102 formed on the rod 53. The sleeve 100 is provided with slots 103 that surround fixed stop members 104 which are secured to the tube 64 near its lower end and which limit the upward and downward movement of the sleeve 100. A lug 105 extends out from the upper edge of the sleeve 100 into the path of a curved arm 106, the lower end of which is pivotally attached to a lug 107 carried by a stationary bracket 108. The upper end of the arm 106 is free to swing vertically and is guided by means of a hooked finger 109 which slides beside the bracket 108.

When the punty arm moves to the left in Fig. 6 to carry the tumbler to the buffing position, the lug 105 passes under the swinging arm 106 and lifts it up, but as soon as the lug 105 passes beyond and above the arm 106 the arm 106 falls down as far as it is permitted to fall by the hooked guide finger 109, and when the punty arm again descends the lug 105 slides over the top of the arm 106 and so causes the sleeve 100 to move the punty rod lengthwise against the pressure of the spring 60. When the lug 105 reaches the lower end of the arm 106 it suddenly drops off and the spring 60 causes the punty to drop with considerable force, thus knocking the tumbler off into the sand box 10.

In order to cushion somewhat the shock between the parts of the punty arm when the ware is knocked off in the manner just described, two spring members 110 are suspended from a collar 111 secured to the outer tube 64 of the punty arm and engage with their ends beneath the flange 112 on the sleeve 100, as shown in Figs. 1 and 6.

*The glory hole furnace.*

The construction and operation of the glory hole furnace 7, may best be seen on Figs. 1 and 5. This furnace, with its blower, fuel tank and other attachments, is mounted on a truck 115 having wheels 116 that run on transverse pipe tracks 117 which are connected together to form a second truck, and which are provided with wheels 118 running on fixed pipe tracks 119 that are suspended from the upper lengthwise beams of the frame 11 by means of hangers 120.

The entire furnace structure is moved forward and back on the lengthwise tracks 119 by means of a compressed air cylinder 121 which is suspended between the two punty arms as shown on Figs. 3 and 4 and which has its piston rod 122 connected by means of a coupling 123 to the center of the forward pipe track 117. Stops 124 carried by the tracks 119 limit the movement of the glory hole furnace structure in both directions.

The truck 115 is moved sidewise on the tracks 117, to cooperate alternately with the two punties, by means of a compressed air cylinder 125 which is slung beneath the truck 115 and which has its piston rod 126 connected rigidly to the frame of the machine.

Gas or oil may be used as the fuel for the furnace 7. As shown, the furnace is supplied with oil from a tank 127 from which a pipe 128 controlled by a valve 129 and having a drain-valve 129ª leads to a burner 130 where the fuel is mixed with air supplied through a pipe 131, leading from the compressed air tank 13 through suitable pipe connections, not shown. In order to produce the required blast in the furnace 7, a small blower 132 is suspended by means of hangers 133 beneath the glory hole furnace and is driven by a small electric motor 134 controlled by a switch 135. The air blast from the blower passes through pipes 136 and 137 to a nozzle 138 which directs the blast into the furnace.

During the operation of the glory hole furnace to fire-finish a tumbler or other glass article, the furnace is advanced by means of the cylinder 121 to enclose the tumbler for a short time, and is then preferably drawn back to cool the tumbler slightly and prevent the edges of the tumbler from thickening. At this time a shutter 139 is dropped in front of the glory hole to cut off the heat from the tumbler, and is again raised to enable the glory hole to again enclose the tumbler. The shutter 139 is provided at its four corners with ears 140 through which extend vertical guide rods 141 that are joined at their upper ends by means of a strap 142 connected by means of a brace 143 to the vertical pipe 136. The lower ends of the guide rods 141 are bent inwardly and are secured to the axles of the truck 115. The shutter 139 is carried on the upper ends of vertical rods 144, the lower ends of which are connected by means of a bar 145 that is carried on the upper end of the piston rod 146 of a vertical compressed-air cylinder 147 which is supported on brackets 148 adjacent to the blower 132 and the motor 134. The compressed-air cylinder 147 is operated by a suitable cam, not shown, at proper intervals to raise and lower the rod 146, thereby raising and lowering the shutter 139 in front of the glory hole.

The heat of the glory hole is regulated somewhat by adjusting a plug 150 which is slidably carried on a rod 151 so as to move toward and away from a rear opening 152 in the glory hole furnace.

*Buffing mechanism.*

After the ware is fire-polished in the glory hole furnace, the punty arm swings downward and back through an angle of 180°, thereby bringing the article into position to be engaged by the outside buffer 8, and by the inside buffer 9, both of which are suitably shaped to conform respectively to the outer and inner contour of the ware, and which are composed of phosphor-bronze or carbon, wood, or any other suitable buffing material. Both of these buffers are continuously moved backward and forward, and are adjustable so as to fit any size or shape of tumbler. The outside buffer 8 consists of a block of buffing material held by means of screw clamps 155 to a holder 156, as shown on Fig. 13. This holder, as shown on Figs. 3 and 13 to 15, is carried by two arms 157 which are pivoted on a rod 158 carried by a slide 159 working in a guide 160 which is vertically adjustable by means of a screw 161 provided with a handle 162 and having a clamp 163 for fixing the screw 161 in its adjusted position. An arm 164 is supported at one end by the rod 158 and carries a weight 165 for regulating the pressure of the buffer 8 upon the ware. The slide 159 is connected by means of a link 166 to one arm 167 of a bell crank, the other arm 168 of which is provided with a roller 169 which works in a groove formed in a cam 170 secured to the counter-shaft 17. Since the shaft 17 rotates continuously, the cam 170 operates through the connections just described to continuously reciprocate the outside buffer 8.

As soon as the article to be polished reaches the buffing position, the outside buffer 8 is lowered into engagement with the ware. This is accomplished by the construction shown in Figs. 13 to 15. As shown in these figures, the buffer-supporting arms 157 are suspended from a bale 175 which in turn is suspended between two rollers 176 at the lower end of a vertical rod 177 which slides in a fixed sleeve 178 and is screw-threaded at its upper end to receive an adjusting nut 179. Both the rod 177 and the sleeve 178 are slotted to admit the wedge shaped end 180 of an operating lever 181, which is pivotally connected to a connecting rod 182. The rod 182 is connected by means of a coupling 183 to a rod 184 having a roller 185 which runs upon a cam 186 on the cam shaft 26. This cam is so shaped that when no tumbler is at the buffing position the wedge member 180 is caused to advance into the slots in the sleeve 178 and the rod 177, thereby acting through the roller 187 to raise the buffer 8 out of its operative position. As soon as a tumbler is brought to the buffing position, the cam 186 permits the wedge member 180 to be withdrawn by a spring 188, shown on Fig. 2, whereupon the buffer 8 descends by gravity into contact with the tumbler with a pressure which is regulated by the position of the weight 165.

A small hopper-shaped box 189 is provided on top of the outside buffer 8 and compressed air is continuously blown into this box through a pipe 190 provided with a valve 191 for cooling the buffer. Both of the pipes 190 are connected to a pipe 192, which in turn is connected to the compressed air tank 13. This air blast helps to cool the buffing block 8. If more cooling is necessary, additional air may be supplied through a large air pipe 193 controlled by a valve 194 and having branches 195 directed toward the buffing position of the glassware.

The inside buffer 9 is adjustably secured by means of a thumb-screw 200 to a rod 201 which is suspended from a sleeve 202 carried by a reciprocating rod 203. The rod 203 slides in guides 204 and is provided with a bent lateral extension 205 which slides in a guide 206 and insures the correct lengthwise movement of the rod 203. A link 207 connects the inner end of the rod 203 with one end of a sliding bar 208, the other end of which is connected to a rod 209 carrying a roller 210 which runs on a cam 211 on the cam shaft 26. The cam 211 co-operates with a spring 212 to reciprocate the buffer 9 continuously.

For the purpose of regulating the pressure with which the inside buffer 9 presses against the glass, a curved arm 213 is adjustably carried by the collar 202 adjacent to the rod 203, and is fixed in position by means of a thumb screw 214. A spring 215 connects the outer end of the curved arm 213 with the rod 201 and, as clearly shown in Fig. 3, tends to pull the buffer 9 into engagement with the inner surface of the tumbler with a pressure which can be regulated by changing the angular position of the arm 213 on the rod 203.

When the buffers 8 and 9 are composed of carbon, water may be sprayed on the buffers by means of an atomizer, not shown, and a cam 216 is provided on the cam shaft 26 for the purpose of operating such an atomizer through a rod 217.

After the tumbler has been polished by the buffers 8 and 9, the punty arm descends to the knocking-off position, where the tumbler is knocked off in the manner described above, and continues to the vertical ware-receiving position, where it is stopped in the proper place by means of an air cushion 218, the piston rod 219 of which carries a stop member 220. One end of the stop member 220 extends, as shown at 221, through a slot 222 in the lateral arm 223 carried by a vertically sliding shifting lever 224. When the shifting lever 224 is depressed it rocks the stop member 220 into the path of movement of a lug 225 carried by the forked yoke 65 of the punty arm, and when the shifting lever 224 is raised it rocks the stop member 220 out of the path of the lug 225. The shifting lever 224 is raised and lowered at the proper intervals to stop the punty arm and then to allow it to pass by means of a cam 226 on the cam shaft 26. For this purpose the upper end of the lever 224 is suspended from one arm 227 of a bent lever 228 which rocks in bearings 229 and has an arm 230 in line with the arm 227 which is connected to a vertical rod 231 carrying a cam roller 232 which runs on the cam 226.

As stated above, the punty arm is rotated continuously, by means of the cylinder 77 and the rack 78, while it is in the horizontal fire-polishing and burnishing positions, but is not rotated in the sticking-up position. This intermittent operation of the cylinder 77 for rotating the punty rod is produced by means of two poppet valves 235, each of which has a stem 236 which extends down into the path of one of the arms of the punty yoke 65, as best shown on Fig. 4. When the punty arm is in either of its horizontal positions, it raises one of the stems 236, and thereby admits compressed air to the cylinder 77, the air passing from the tank 13 through the pipe 42 and thence through pipes 237, 238, 239 and 240 to a header 241 which has two branches 242 leading to the valves 235, the pipes 242 being controlled by means of valves 243.

The internal construction of the poppet valves 235 is shown on Fig. 9. As shown in that figure, the casing 244 of the valve is divided into upper and lower chambers 245 and 246 which communicate respectively with the inlet pipe 242 from the compressed air tank and with the pipe 98 which leads to the cylinder 77. The valve stem 236 is provided with a head 247 having two transverse ports 248 and 249 connected by a central vertical passage 250. A spring 251 tends to force the valve rod down into the position shown in Fig. 9 in which there is no communication between the pipes 242 and 98. When the valve stem 236 is raised by the yoke 65 of the punty arm, the port 248 is brought into communication with the inlet pipe 242, and the compressed air passes through the port 248, the vertical passage 250 and the lower port 249 to the pipe 98, and thence to the cylinder 77. As soon as the punty arm descends, the spring 251 again seats the valve stem and cuts off communication between the pipes 242 and 98. Therefore, when the punty arm is swinging from the sticking-up position to the fire-polishing position, from the fire-polishing position to the buffing position, and from the buffing position to the sticking-up position there is no rotation of the punty arm, except that produced by the bevel pinion 55 turning on the large bevel gear 56.

Air cushions or dash pots 252 are provided to take up the shock of the punty arm when it swings to the heating and buffing positions. These air cushions are provided with stems 253 which extend in the path of movement of the punty arm as it rises to its horizontal position.

In addition to the cams 226, 45, 216, 186, 211 and 74, which, as described above, are carried at each end of the cam shaft 26 in the order stated, the cam shaft also carries two cams 255 and 256 operating the air valves 261 and 262 through cam rollers 257 and 258 and spring-pressed valve rods 259 and 260, respectively. The valve 261 controls the admission of compressed air from the tank 13 to the central compressed air cylinder 121 which shifts the glory hole furnace lengthwise, while the valve 262 controls the admission of compressed air to the cylinder 125 which shifts the glory hole furnace sidewise. Pipes 263 connect the valve 261 and the cylinder 121, while the ends of the pipes 264 which connect the valve 262 and the cylinder 125 are shown on Figs. 4 and 5, the rest of the latter pipes being omitted from the drawing for the sake of clearness. The air connections to the glory hole furnace are through rubber hose which permit the glory hole furnace to move freely. The pipe 42 conducts compressed-air from the tank 13 to the valves 44, as described above, through a manifold pipe 42$^a$ from which branch pipes 43, 43$^a$, 43$^b$ and 43$^c$ lead to the valves 44, 261, 73 and 262 respectively.

The two punty arms operate alternately so that when one of the punty arms brings a tumbler to the glory hole the other punty arm brings a previously fire-polished tumbler to the buffing position. The glory hole furnace shifts from side to side while the punties are swinging in order to cooperate with the two punties alternately.

The operation of the several mechanisms which compose our machine has been described in connection with the construction of each mechanism, and it now remains to follow a given tumbler in its course through the machine. While the tumbler is still plastic, it is placed by a workman on the cap 37 of the stick-up device, as shown in Fig. 8. The cam 45 then operates through the valve 44 to admit air to the stick-up cylinder 30, and the tumbler is thereby raised and pressed against the underside of the punty 3 which, at the moment, is directly above the stick-up device. The stick-up device is then lowered automatically and the punty arm, carrying the tumbler with it, then swings up to the right until it reaches the horizontal position opposite to the glory hole furnace, which has meanwhile been shifted by the cylinder 125 into the proper position on the tracks 117. This swinging movement of the punty arm is produced by the rack 6 actuated by the cylinder 72, which in turn is operated by the valve 73 controlled by the cam 74. In its upward movement the punty arm strikes the stem 236 of one of the poppet valves 235 and the stem 253 of the dash pot or air cushion 252. The movement of the punty arm is thereby checked without shock, and at the same time air is admitted to the cylinder 77 which immediately begins to rotate the punty arm back and forth through the quick-reversing drive described above. The cam 255 then operates the valve 261 to admit air to the forward end of the cylinder 121, which thereupon pulls the glory hole furnace forward to enclose the tumbler, and heat the tumbler to the required temperature, which may be regulated by speeding up or slowing down the movements of the punty arm by means of the hand air valves, or by opening or closing the burner 130. The cam 255 is preferably so shaped that after the tumbler has been in the glory hole for a few moments the glory hole furnace is pushed back from the tumbler and the cylinder 147 is then automatically operated to drop the shutter 139 in front of the glory hole furnace, thereby cooling the edge of the tumbler. After a short interval the cylinder 147 is again automatically operated to raise the shutter 139 and the cylinder 121 is then operated again to bring the glory hole furnace forward to receive the tumbler a second time and give it an additional polish. Then the glory hole furnace is again moved back to free the article and permit it to be moved to the finishing position. This double treatment in the glory hole furnace permits the edges or other thin portions of the glass article to cool slightly between the two fire-polishing operations, thereby preventing the thickening of the edge or other thin portion of the article. If desired, the operating cams may be so constructed as to move the glory hole back and forth three or more times for each tumbler.

When the fire-polishing operation is completed the cylinder 72 is again operated by the cam 74 to raise the rack 6 and thereby swing the punty arm through an angle of 180° which brings the fire-polished tumbler to the buffing position. While arriving at this position the punty arm engages the stems 236 and 253 of the poppet valve 235 and the air cushion 252 which is on the side of the machine toward the finishing position, and the poppet valve 235 thereupon operates to again rotate the punty arm 3. As soon as the tumbler reaches the finishing position, the outside buffer 8 is lowered upon it by the automatic withdrawal of the wedge 180 by means of the spring 188 which at this time is left free by the cam 186. The outside buffer 8 is reciprocated continuously by the cam 170.

The inside buffer 9 also engages the tumbler as soon as it reaches the buffing position, and is reciprocated continuously by means of the cam 211.

After the buffing operation is completed the outside buffer is raised by means of the cam 186 acting through the wedge 180, and the cylinder 72 is again operated by the cam 74 to lower the rack 6, which swings the punty arm 3 down toward the sticking-up position. During this movement the knocking-off device operates in the manner described above to withdraw the punty arm and then release it quickly, which jars the tumbler loose from the punty arm and the tumbler falls into the sand box 10, from which it is removed by the workman. The punty continues to the stick-up position, where it is stopped by engagement between the lug 225 and the stop member 220, which has been moved into the path of movement of the lug 225 by the cam 226 acting through the lever 228 and the shifting lever 224. While the stick-up device is again operating to attach a new tumbler to the punty, the cam 226 withdraws the stop member 220 from the path of movement of the lug 225, and the whole operation is then repeated.

It will be observed that the machine is entirely automatic, the only workmen required being those who place the tumbler upon the stick-up devices and remove the finished tumblers from the sand box.

It will be understood that various changes in the construction and arrangement of parts may be made without departing from our invention, the scope of which is indicated in the appended claims.

We claim as our invention:

1. Apparatus for fire polishing and finishing glassware comprising a ware-holder fluid-pressure means for moving said ware-holder successively to a ware-receiving position, a fire-polishing position, a finishing position, and a ware-detaching position, and means for attaching ware to said holder.

2. Apparatus for fire polishing and finishing glassware comprising a ware-holder, cam-controlled fluid-pressure means for moving said ware-holder successively to a ware-receiving position, a fire-polishing position, a finishing position, and a ware-detaching position, and means for attaching ware to said holder.

3. Apparatus for fire polishing and finishing glassware comprising fire polishing means, finishing means, a punty-carrying arm oscillable on a horizontal axis, and fluid-pressure means for automatically attaching the ware to said arm, and for then swinging said arm to bring said ware successively to a fire-polishing position, a finishing position, and a ware-detaching position.

4. Apparatus for fire polishing and finishing glassware comprising a punty-carrying arm oscillable on a horizontal axis, fluid pressure means for swinging the said arm in a semi-circular path below said axis of rotation, and a ware-attaching device, a fire-polishing furnace and a finishing device disposed adjacent to the path of movement of the ware carried by said arm.

5. Apparatus for fire-polishing and finishing glassware comprising an oscillable ware holder, a fire polishing furnace, a finishing device, a ware-attaching station between said furnace and said finishing device, means for swinging said ware holder between said furnace and said finishing device, and means for automatically attaching the ware to said holder at said ware-attaching station.

6. Apparatus for fire-polishing and finishing glassware comprising an oscillable ware holder, a fire-polishing furnace, a finishing device, an automatically operable ware-attaching device between said fire-polishing furnace and said finishing device, and fluid-pressure means for swinging said ware holder between said fire-polishing furnace and said finishing device, and for actuating the said ware-attaching device.

7. Apparatus for fire-polishing and finishing glassware comprising a punty-carrying arm oscillable on a horizontal axis, a fire-polishing furnace, and a finishing device disposed on opposite sides of the axis of rotation of said arm, a ware-attaching device disposed below said axis of rotation, and fluid-pressure means for swinging said punty arm to successively move the ware carried thereby from said ware-attaching device to said fire-polishing furnace, thence to said finishing device and back to said ware-attaching device.

8. Apparatus for fire-polishing and finishing glassware comprising an oscillable ware-holder, a fire-polishing furnace, a finishing device, a ware-attaching station between said furnace and said finishing device, means for swinging said ware-holder between said furnace and said finishing device, means for automatically attaching the ware to said holder at said ware-attaching station, and automatically operable means for detaching the said finished ware from said punty while said ware-holder is swinging from said finishing device to said ware-attaching device.

9. Apparatus for fire-polishing and finishing glassware comprising a punty-carrying arm oscillable on a horizontal axis, a fire-polishing furnace and a finishing device disposed on opposite sides of the axis of rotation of said arm, a ware-attaching device disposed below the said axis of rotation, and fluid pressure means for swinging said punty arm successively from a vertical position above said ware-attaching device, upwardly to a horizontal position adjacent to said fire-polishing furnace, thence downwardly through an angle of 180° to a horizontal position adjacent to said finishing device, and thence down to a vertical position above said ware-attaching device.

10. Apparatus for fire-polishing and finishing glassware comprising a punty-carrying arm oscillable on a horizontal axis, a fire-polishing furnace and a finishing device disposed on opposite sides of the axis of rotation of said arm, a ware-attaching device disposed below the said axis of rotation, fluid pressure means for swinging said punty arm successively from a vertical position above said ware-attaching device, upwardly to a horizontal position adjacent to said fire-polishing furnace, thence downwardly through an angle of 180° to a horizontal position adjacent to said finishing device, and thence down to a vertical position above said ware-attaching device, and automatically operable means for detaching the finished ware from said punty while said arm is swinging down from said finishing device to said ware-attaching device.

11. Apparatus for fire-polishing and finishing glassware comprising a punty-carrying arm oscillable on a horizontal axis, fluid pressure means for oscillating the said arm from a vertical ware-attaching position to a horizontal fire-polishing position, a glory-hole furnace in line with the said arm when in said horizontal fire-polishing position, and means for moving said furnace to enclose the ware and for thereafter withdrawing said furnace from the ware.

12. Apparatus for fire-polishing and finishing glassware comprising a punty arm oscillable on a horizontal axis, fluid-pressure means for oscillating the said arm from a vertical ware-attaching position to a horizontal fire-polishing position, a glory hole furnace disposed in line with said arm when said arm is in said horizontal fire-polishing position, and fluid-pressure means for moving said furnace to envelop the ware and for thereafter withdrawing said furnace from the ware.

13. Apparatus for fire-polishing glassware comprising two punty-carrying arms oscillable on a common horizontal axis, means for oscillating each of said arms from a vertical ware-attaching position to a horizontal fire-polishing position, and a glory hole furnace cooperating alternately with said arms to fire-polish the glassware carried thereby.

14. Apparatus for fire-polishing glassware comprising two punty-carrying arms oscillable on a common horizontal axis, means for oscillating each of said arms from a vertical ware-attaching position to a horizontal fire-polishing position, a glory hole furnace cooperating alternately with said arms to fire-polish the glassware carried thereby, and fluid-pressure means for reciprocating the said glory hole furnace lengthwise to enclose the ware and to withdraw said furnace from the ware, and fluid-pressure means for shifting the said glory hole furnace alternately to bring said furnace into cooperation with said punty arms alternately.

15. Apparatus for fire-polishing glassware comprising a ware-holding punty, a glory hole furnace, and mechanically operable means for moving said glory-hole furnace to enclose the ware carried by said punty, to withdraw from said ware, and to enclose said ware a second time.

16. Apparatus for fire-polishing glassware comprising a ware-holding punty, a glory-hole furnace, mechanically operable means for bringing said punty into line with said glory-hole furnace, and mechanically operable means for moving said glory-hole furnace to enclose the ware carried by said punty, to withdraw from said ware, and to enclose said ware a second time.

17. Apparatus for fire-polishing glassware comprising a ware-holding punty, a glory-hole furnace, mechanically operable means for bringing said punty into horizontal position in line with said glory-hole furnace, and mechanically operable means for reciprocating said glory-hole furnace horizontally to enclose the ware carried by said punty a plurality of times and to expose said ware to the air between said enclosing movements.

18. Glass finishing mechanism comprising a fluid-pressure cylinder, a ware support carried by the piston of the said cylinder, automatic means for admitting fluid pressure to the said cylinder for raising and lowering said ware support, and a ware-holder adapted to receive ware from said support when said support is raised.

19. Glass finishing mechanism comprising a fluid-pressure cylinder, a ware-support yieldingly carried by the piston rod of said cylinder, cam-controlled automatic means for admitting fluid-pressure to the said cylinder for raising and lowering said ware-support, and a ware-holder adapted to receive ware from said support when said support is raised.

20. A ware-attaching device for glass-finishing machines comprising a fluid-pressure cylinder having its piston rod extending upwardly and vertically therefrom, a head carried by the upper end of said piston rod, a sleeve slidably surrounding said head, spring cushioning means interposed between said head and the closed upper end of said sleeve, a ware-support removably carried by said sleeve, and cam-controlled automatic means for admitting fluid pressure alternately to the upper and lower ends of said cylinder for raising and lowering said ware support.

21. A glass-finishing machine comprising a punty, a punty arm carrying said punty, fluid-pressure means for rocking the said punty arm around a horizontal axis from a vertical ware-attaching position to a horizontal fire-polishing position, thence to an opposite horizontal finishing position, and thence to a ware detaching position, fluid-pressure means for oscillating the said punty while in the said fire-polishing and finishing positions, and air valves for causing the said punty-rotating means to operate when the punty is in the said fire-polishing and finishing positions only.

22. A glass-finishing machine comprising a punty, a punty arm carrying the said punty and mounted to swing on a horizontal axis, the said punty arm comprising a chuck for holding said punty, a slidable rod carrying said chuck, means for rotating the said rod, a forked yoke for suspending the said rod from its horizontal axis, and fluid-pressure means for imparting rocking movements to said yoke.

23. A glass-finishing machine comprising a punty, a chuck carrying said punty, a slidable rod carrying said chuck, a sleeve surrounding said rod and connected to rotate therewith, a pinion carried by said sleeve, a gear for rotating said pinion, fluid-pressure means for oscillating said gear, a forked yoke for supporting said sleeve and rod, and fluid-pressure means for imparting rocking movements to said yoke.

24. A glass finishing machine comprising a punty, a chuck carrying said punty, a slidable and rotatable rod carrying said chuck, the said rod having a reduced upper portion, a sleeve surrounding said rod and connected to rotate therewith, a spring surrounding the reduced upper end of said rod, means for closing the upper end of said sleeve and for compressing said spring, a pinion carried by said sleeve, a gear for driving said pinion, means for oscillating said gear, a tube surrounding said sleeve, and a member slidably surrounding said tube, and adapted to move said rod lengthwise.

25. A glass finishing machine comprising a punty, a chuck carrying said punty, a slidable rod carrying said chuck, a spring tending to resist lengthwise movement of said rod, a member adapted to move said rod lengthwise against the compression of said spring, a lug extending laterally from said member, means for swinging said rod around a horizontal axis, and a curved and pivotally movable cam track disposed in the path of movement of the said lug, whereby when the said punty oscillates the said cam track operates through said lug to draw said rod against the compression of said spring, and thereafter releases said rod and permits said spring to return said rod to its normal position.

26. A glass finishing machine comprising a punty, a punty-carrying arm, means for rotating said punty, and means for instantaneously changing the direction of rotation of said punty.

27. A glass finishing machine comprising a punty, fluid-pressure operative means for rotating said punty, and means for instantaneously changing the direction of rotation of said punty, comprising a valve controlling the said fluid pressure means, a reversing valve rod, and a quick-acting trip for operating said rod.

28. A glass finishing machine comprising a punty, fluid pressure operative means for rotating said punty, comprising a fluid pressure cylinder, a rack operated by the piston rod of said cylinder, a gear engaging said rack and operatively connected to rotate said punty, and means for instantaneously changing the direction of rotation of said punty, comprising a valve controlling the application of fluid-pressure to said cylinder, a valve rod controlling said valve, a shifting lever connected to change the position of said valve rod, a trip member engaged to operate said lever, and means carried by the said rack for operating the said trip member.

29. A glass finishing machine comprising a glory hole furnace having a ware-receiving opening in one side, and fluid-pressure means for reciprocating the said furnace horizontally to cause the said furnace to envelop the ware, and then to withdraw from the ware.

30. A glass finishing machine comprising a glory-hole furnace having a ware-receiving opening in one side, fluid-pressure means for reciprocating the said furnace horizontally in the direction of said opening, and fluid-pressure means for shifting the said furnace laterally.

31. A glass finishing machine comprising a glory-hole furnace having a ware-receiving opening in one side, a wheeled support for said furnace, tracks supporting the said wheels, and a fluid-pressure cylinder connected to the said furnace support to reciprocate the said furnace on the said tracks.

32. A glass-finishing machine comprising a glory-hole furnace having a ware-receiving opening in one side, a wheeled support for said furnace, tracks supporting the said wheels, a wheeled support for said tracks, additional tracks for said last-named wheeled support, and a second fluid-pressure cylinder operatively connected to shift the said first-named tracks laterally on said second tracks.

33. A glass finishing machine comprising a glory-hole furnace having a ware receiving opening in its side, cam-controlled fluid-pressure means for shifting the said furnace both longitudinally and laterally with respect to the said opening, a blower and a motor therefor movable with said furnace, a shutter also movable with said furnace, and fluid pressure means for raising and lowering said shutter in front of said opening.

34. A buffing device for finishing glassware comprising a holder and a phosphor-bronze buffing member carried by said holder.

35. A buffing device for finishing glassware cimprising an outside buffer, an inside buffer, means for adjusting the said buffer to conform to the shape of the glassware, cam-controlled means for reciprocating the said buffers, a holder for the said outside buffer, means for directing cooling fluid against the said outside buffer, means for regulating the pressure of the said outside buffer upon the glassware, a vertically movable adjustable support for the said outside buffer, a vertical slot in the said support, a wedge-shaped lifting member adapted to extend into said slot, and cam-controlled means for reciprocating the said lifting member to raise the said outside buffer above its operative position and to thereafter lower the said outside buffer against the glassware.

36. A buffing device for finishing hollow glassware comprising an outside buffer, an inside buffer, cams for reciprocating the said buffers vertically and lengthwise, respectively, and means for adjusting the position of said buffers to conform to the shape of the glassware.

In testimony whereof, we the said NOAH THOMAS EDGAR SKINNER and ANDREW J. SANFORD have hereunto set our hands.

NOAH THOMAS EDGAR SKINNER.
ANDREW J. SANFORD.